2,780,639
Patented Feb. 5, 1957

2,780,639

PRODUCTION OF ACRYLONITRILE

Thomas R. Steadman, Waban, and James F. Gabbett, Jr., Weymouth, Mass., assignors, by mesne assignments, to Escambia Chemical Corporation, Pace, Fla., a corporation of Delaware No Drawing. Application September 19, 1955,
Serial No. 535,306

5 Claims. (Cl. 260—465.3)

This invention relates to the production of chemicals and in particular to an improved process for the production of acrylonitrile.

A principal object of the present invention is to produce high yields of acrylonitrile readily and cheaply by reacting hydrogen cyanide with acetylene in the vapor phase in the presence of a suitable catalyst.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the detailed description.

It has heretofore been demonstrated that acrylonitrile could be obtained by the catalytic vapor phase reaction between hydrogen cyanide and acetylene. However, very little, if any, effort has been made, at least on a commercial scale, to utilize in this reaction dilute acetylene streams, particularly acetylene streams containing less than about 15 percent acetylene. The preferred acetylene streams may be obtained by diluting pure acetylene with diluents such as nitrogen, hydrogen, carbon oxides, mixtures thereof and the like. Acetylene streams containing less than about 15 percent acetylene are now being commercially produced directly by such well-known methods as the "Wulff" and "Sachsse" processes and like processes which utilize hydrocarbons or mixtures thereof as the starting materials.

One well-known method for producing acetylene streams containing less than about 15 percent acetylene is the "Wulff" process. This process essentially involves the thermal cracking of hydrocarbon gases at a high temperature. The "Wulff" process and modifications thereof are fully described and claimed in U. S. Patents 1,880,307, 1,880,308, 1,880,309, 1,966,779, 2,037,056, 2,236,534, 2,236,535, 2,236,555, 2,319,679, 2,475,093 and many others.

Another well-known method for producing dilute acetylene is the "Sachsse" process. This process involves the incomplete combustion of a hydrocarbon or mixtures of hydrocarbons to form acetylene streams containing less than about 15 percent acetylene. A more detailed discussion of the "Sachsse" process may be found in U. S. Patents 2,195,227, 2,235,749 and 2,664,450.

The composition of the dilute acetylene streams obtained from the above process depends, to great extent, upon the hydrocarbon or hydrocarbons employed as the starting material. However, these streams generally contain various proportions of acetylene (in amounts of less that about 15 percent), carbon oxides, hydrogen, nitrogen and unsaturated and/or saturated hydrocarbons. Thus, when hydrogen cyanide and a dilute acetylene stream undergo reaction, the small percentage of unreacted acetylene, in the presence of large percentages of other gases in the product stream, makes it uneconomical to recycle or recover any of the unreacted acetylene. Hence, in order to obtain the highest conversion of acetylene and the highest degree of economy, it becomes necessary to conduct the reaction so as to use up as much acetylene as possible to eliminate the need for any acetylene recycle or recovery. On the other hand, hydrogen cyanide can be selectively recovered from the product stream of the reaction by relatively simple procedures of absorption and distillation. However, it has heretofore been the overwhelming practice to use an amount of acetylene which is in excess of the stoichiometric amount required to completely react with the hydrogen cyanide.

The present invention is directed to a vapor phase production of acrylonitrile which comprises passing a dilute acetylene stream and hydrogen cyanide over a suitable catalyst for the reaction at an elevated temperature. The acetylene is preferably present in an amount which is less than that stoichiometrically necessary to react with all the hydrogen cyanide fed. Molar ratios of acetylene to hydrogen cyanide are preferably maintained on the order of between about 0.5:1 to less than about 1:1.

In one preferred embodiment of the invention, the dilute acetylene stream contains less than about 15 percent acetylene. The reaction is preferably carried out at a temperature within the range of from about 450° C. to 700° C. and in the presence of a porous carbonaceous support impregnated with from about 3 to about 15 percent by weight of either an alkali metal hydroxide, cyanide or carbonate.

A more detailed description of producing acrylonitrile employing the preferred molar ratios of acetylene to hydrogen cyanide is given in the following examples which are set forth only for the purpose of illustration and are not to be construed as limiting the invention.

EXAMPLE I 150 grams of an unactivated softwood charcoal were heated at atmospheric pressure to a temperature of about 700° C. in a stream of hydrogen for about 24 hours. Water and other oxgenated products formed during the conditioning were removed. The charcoal, on completion of the hydrogenation, was found to weigh 120 grams. 120 grams of deoxygenated charcoal were then impregnated with an aqueous solution containing about 12.0 grams of sodium hydroxide to provide, after drying, about 10 percent by weight of sodium hydroxide in the charcoal. Upon completion of the sodium hydroxide impregnation, the catalyst was heated at atmospheric pressure at a temperature on the order of about 560° C. in a stream of hydrogen cyanide until the recovery of hydrogen cyanide in the off gases rose to over 80 percent, which, in this case, was on the order of about 60 minutes. A mixture of acetylene and hydrogen cyanide was passed at a space velocity of about 550 hr. $^{-1}$(STP) through a calorized steel reactor containing approximately 132 grams of the catalyst (i. e., 120 grams of deoxygenated charcoal plus weight of sodium hydroxide). The calorized tube was heated within the temperature range of between about 560° C. and 620° C. The mole ratio of acetylene to hydrogen cyanide was maintained at about 0.72:1, with the amount of acetylene in the acetylene feed stream amounting to approximately 7.6 percent and the pressure being substantially atmospheric. The conversion of acetylene to acrylonitrile of this 11-hour run and the yield of acrylonitrile based on hydrogen cyanide are shown in Table I.

EXAMPLE II

This run was similar to Example I with the exception that the mole ratio of acetylene to hydrogen cyanide was maintained at about 0.56:1. The results of this run are shown in Table I.

EXAMPLE III

This run was similar to Example I with the exception that the mole ratio of acetylene to hydrogen cyanide was maintained at about 0.66:1. The results of this run are shown in Table I.

EXAMPLE IV

This experiment was similar to Example I with the exception that the mole ratio of acetylene to hydrogen cyanide was about 0.95:1. The results of this run are shown in Table I.

EXAMPLE V

This experiment was similar to Example I with the exception that the mole ratio of acetylene to hydrogen cyanide was maintained at about 1.28:1. The results of this run are shown in Table I.

Table I

| Example No. | Duration of Run (Hours) | Mole Ratio, $C_2H_2$/HCN | Average Results | |
|---|---|---|---|---|
| | | | Conversion, percent on $C_2H_2$ | Yield, percent on HCN |
| 1 | 10.9 | 0.72 | 83.4 | 88.3 |
| 2 | 10.3 | 0.56 | 84.2 | 83.1 |
| 3 | 9.7 | 0.66 | 85.0 | 81.8 |
| 4 | 11.0 | 0.95 | 72.0 | 89.6 |
| 5 | 9.6 | 1.28 | 59.8 | 93.7 |

A direct comparison of Examples I through IV with Example V shows that higher conversions of acetylene to acrylonitrile are obtainable when the mole ratio of acetylene to hydrogen cyanide is maintained between about 0.5:1 and less than 1:1 than are obtained when the mole ratio is above 1:1. As mentioned previously, the acetylene stream generally contains acetylene in amounts of less than about 15 percent. Thus, when such a stream is reacted with hydrogen cyanide in the conventional manner (i. e., an excess of acetylene over hydrogen cyanide), there remains an appreciable percentage of unreacted acetylene in the presence of large percentages of other gases. Recycling or recovering the unreacted acetylene greatly increases the cost of operations. However, by maintaining the acetylene, during the reaction, in an amount which is less than that theoretically or stoichiometrically necessary to react with all the hydrogen cyanide fed, the maximum amounts of acetylene are used up so that but a very small percentage of acetylene remains unreacted. The reaction stream, after removal of the acrylonitrile, may thus be discarded, since there is no economical need for recycling or recovering the very small amounts of acetylene therein. Thus, there is obtained the highest utilization of acetylene possible at the lowest cost. The excess hydrogen cyanide can be selectively removed from the product stream of the reaction by a relatively easy procedure of absorption and regeneration. The small decrease in the yield of acrylonitrile based on hydrogen cyanide, when employing the preferred ratios, is more than compensated for by the fact that maximum quantities of acetylene are utilized, acetylene recovery or recycle systems are eliminated, and recovery and recycle of hydrogen cyanide is easy and simple, all of which make the present process commercially and economically attractive.

It was very surprising that the use of excess hydrogen cyanide in this high-temperature, vapor phase synthesis of acrylonitrile should have given such excellent results in view of the fact that alkaline conditions, under certain circumstances, have been reported to bring about the addition of hydrogen cyanide to acrylonitrile, forming succinonitrile.

Either softwood or hardwood charcoals have been found to be satisfactory for use as catalyst supports. However, from an economic standpoint softwood charcoals are preferable. The deoxygenation of the unactivated charcoal and the impregnation of the deoxygenated charcoal with from about 3 to 15 percent by weight of either an alkali metal hydroxide, cyanide or carbonate are more fully described and claimed in copending application Serial No. 382,199, filed September 24, 1953. Likewise, the method and purposes for pretreating the deoxygenated impregnated catalyst with hydrogen cyanide are more fully shown and claimed in copending application Serial No. 459,870, filed October 1, 1954.

The temperature range for the reaction between acetylene and hydrogen cyanide may vary from about 450° C. to about 700° C. However, it is preferably maintained between about 525° C. and 625° C. when the space velocity of the gases passing through the reactor is maintained between about 300 to 800 hr.$^{-1}$(STP). Under these conditions, high yields of acrylonitrile are obtained while the yields of undesirable nitriles are suppressed and substantially eliminated. Temperatures above about 625° C. at the given space velocities tend to produce higher yields of such undesirable nitriles as propionitrile and acetonitrile at the expense of the hydrogen cyanide recovery and the yield of acrylonitrile. Temperatures below about 525° C. at the given space velocities tend to lead to poor conversions of hydrogen cyanide to acrylonitrile, thus making the process commercially unattractive.

The space velocity may vary from about 100 to about 1000 hr.$^{-1}$(STP), preferred space velocities being on the order of between about 300 and 800 hr.$^{-1}$(STP) at reaction temperatures between about 525° C. and 625° C.

In the above examples, specific operating conditions have been given. These conditions, however, are subject to considerable variation without departing from the scope of the invention. For example, the pressure range in the reactor may vary from about atmospheric pressure to about 100 pounds per square inch. Other catalysts, such as oxygen-free, porous charcoal supports impregnated with an alkali metal carbonate or cyanide, can be employed in the reaction.

Since certain changes may be made in the above process without departing from the scope of the invention herein involved, it is intended that all matter contained in the above description shall be interpreted as illustrative and not in a limiting sense.

What is claimed is:

1. The process of producing acrylonitrile from hydrogen cyanide and acetylene which comprises passing a dilute acetylene stream and hydrogen cyanide in a molar ratio of between about 0.5:1 and less than 1:1 over a support carrying a compound selected from the group consisting of the alkali metal hydroxides, cyanides and carbonates maintained at a temperature within the range of 450° C. and 700° C., and recovering the acrylonitrile produced.

2. The process of producing acrylonitrile from hydrogen cyanide and acetylene which comprises passing a dilute acetylene stream and hydrogen cyanide in a molar ratio of between about 0.5:1 and less than 1:1 over a porous charcoal support carrying a compound selected from the group consisting of the alkali metal hydroxides, cyanides and carbonates maintained at a temperature within the range of 450° C. and 700° C., and recovering the acrylonitrile produced.

3. The process of producing acrylonitrile from hydrogen cyanide and acetylene which comprises passing a dilute acetylene stream and hydrogen cyanide in a molar ratio of between about 0.5:1 and less than 1:1 over a deoxygenated charcoal support carrying a compound selected from the group consisting of the alkali metal hydroxides, cyanides and carbonates maintained at a temperature within the range of 450° C. and 700° C., and recovering the acrylonitrile produced.

4. The process according to claim 3 wherein said dilute stream of acetylene contains less than about 15 percent acetylene.

5. The process according to claim 3 wherein said charcoal support is impregnated with from about 3 to 15 percent by weight of a compound selected from the group consisting of the alkali metal hydroxides, cyanides and carbonates.

References Cited in the file of this patent

UNITED STATES PATENTS

| | | |
|---|---|---|
| 2,370,849 | Dutcher | Mar. 6, 1945 |
| 2,385,551 | Spence et al. | Sept. 25, 1945 |
| 2,413,496 | Green et al. | Dec. 31, 1946 |
| 2,413,623 | Harris et al. | Dec. 31, 1946 |
| 2,414,762 | Owen et al. | Jan. 21, 1947 |
| 2,419,186 | Harris et al. | Apr. 15, 1947 |
| 2,425,267 | Schulze et al. | Aug. 5, 1947 |